April 14, 1936.  A. B. GARDNER  2,037,377
CONSTRUCTION FOR AIRCRAFT
Original Filed Jan. 14, 1929  5 Sheets-Sheet 1

Inventor:
Albert B. Gardner

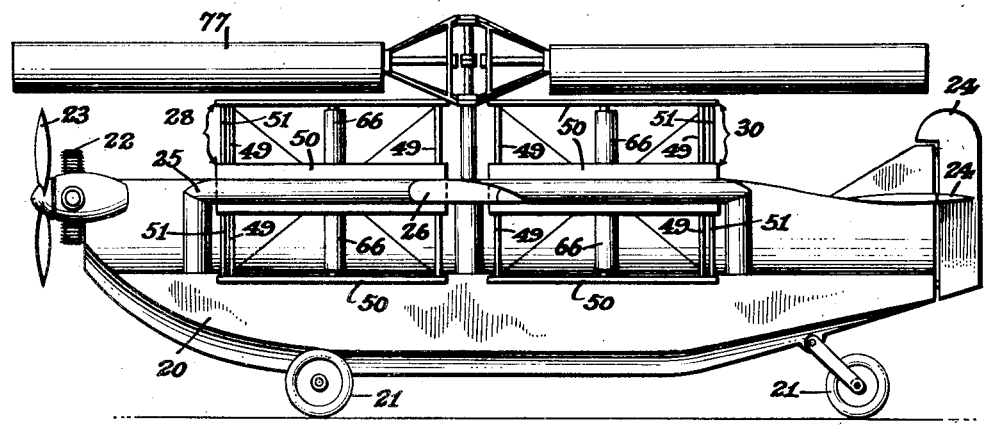

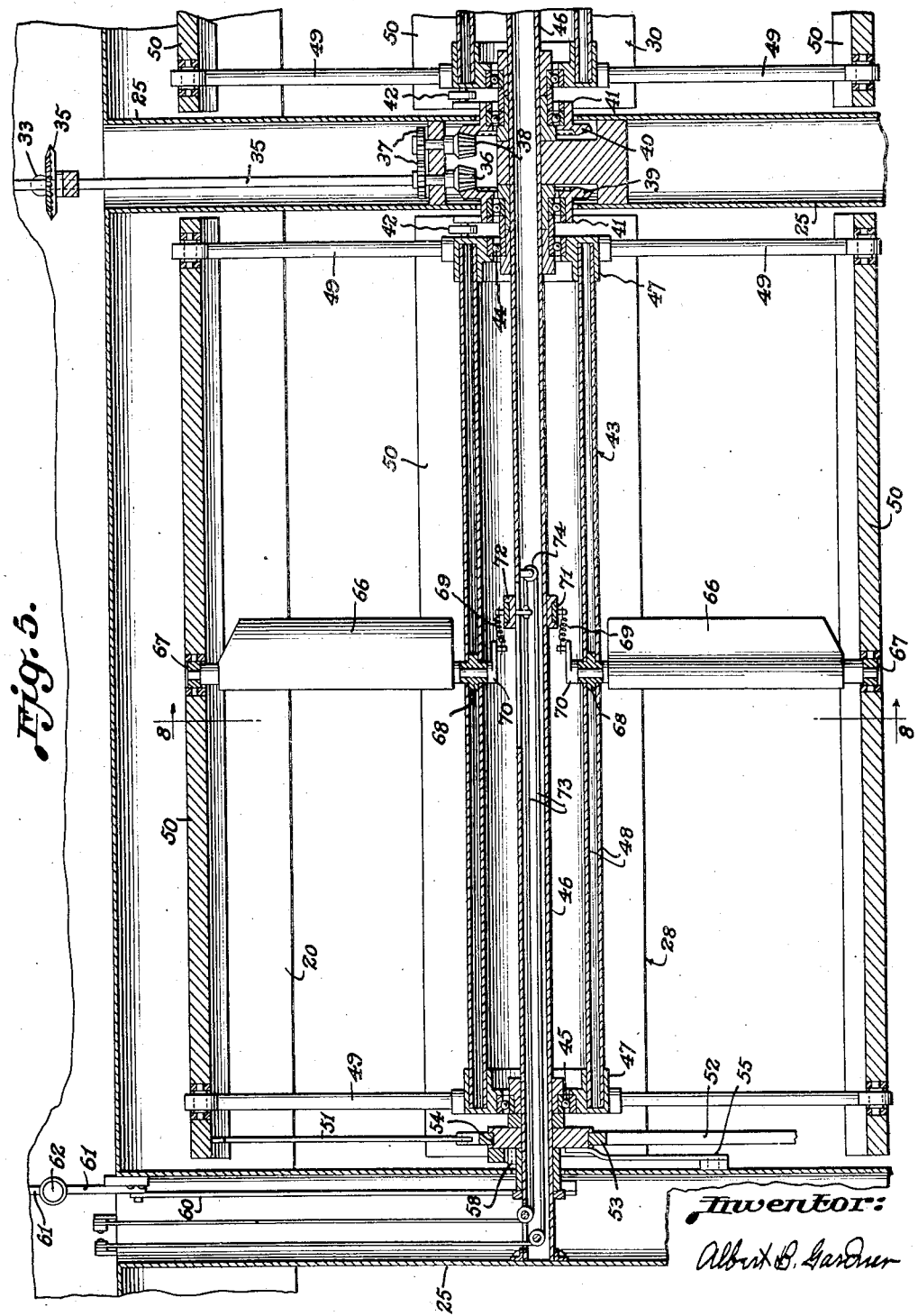

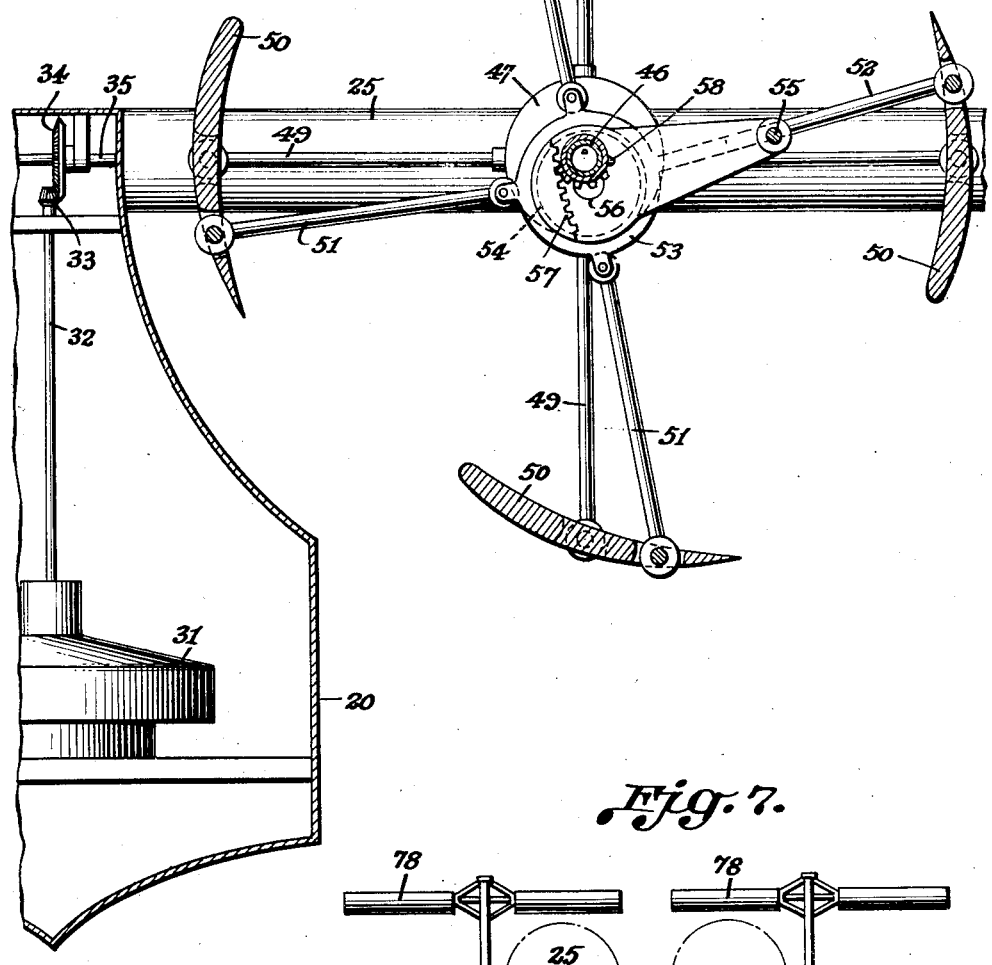

April 14, 1936.   A. B. GARDNER   2,037,377
CONSTRUCTION FOR AIRCRAFT
Original Filed Jan. 14, 1929   5 Sheets-Sheet 5
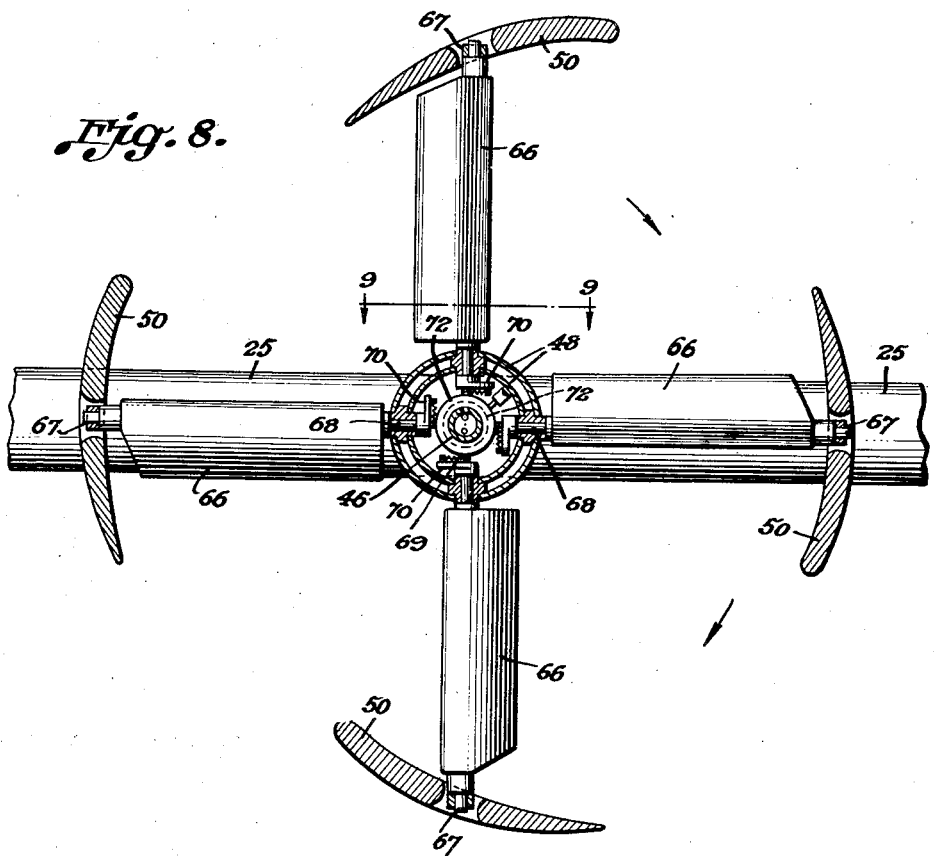
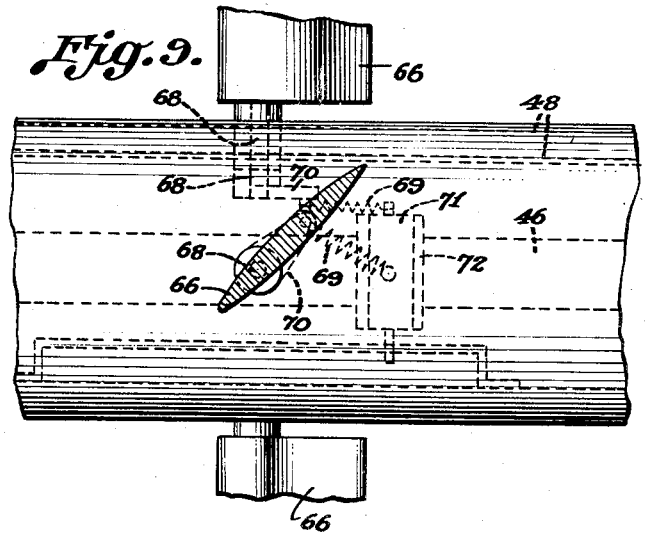
Inventor:
Albert B. Gardner Patented Apr. 14, 1936

2,037,377

UNITED STATES PATENT OFFICE

2,037,377

CONSTRUCTION FOR AIRCRAFT

Albert B. Gardner, Racine, Wis.

Original application January 14, 1929, Serial No. 332,269. Divided and this application June 15, 1934, Serial No. 730,847

33 Claims. (Cl. 244—16)

This invention relates to aircraft and, more specifically, to aircraft of the so-called heavier-than-air type.

This invention also relates to, and the features thereof are fully described in the drawings and specifications of, former application Serial Number 332,269, filed January 14, 1929, now Patent 1,975,098 dated October 2, 1934, of which this application is a division.

One of the objects of this invention is to provide a practical construction of the above nature which shall be simple and dependable. Another object is to provide a construction of the above nature characterized by efficient action. Other objects are to provide a construction of the above nature which shall be readily adaptable to meet conditions of use, easily controlled, characterized by a high degree of safety in performance, economical of power, and adapted to maintain its original efficiency throughout the hardest use. More specifically, the object of this invention is to provide a practical construction of the above nature wherein the craft is sustained in the air by means of a plurality of lifting units disposed to rotate in twin or twin-tandem formation, the axes of which units are disposed in a substantially parallel relation to the longitudinal axis of the fuselage, each unit comprising, in combination, a drive shaft, a plurality of wing-like lifting vanes carried by said shaft and positioned in spaced circumferential relation thereto, the leading and trailing edges of any one of said vanes following, nearly, in the same path, in their respective orbits, varying only to the extent and by reason of the angle of air incidence created by the varying and changeable eccentricity between their respective axes, an eccentric pivotally disposed and operatable during flight to vary the maximum amount of eccentricity between the axes of the lifting unit and said eccentric along a fixed line, and wherein the pivots of these eccentrics in any twin-disposed units are positioned at one side of a horizontal line passing transversely through the axes of said units so as to provide an angle-of-dihedral effect between said twin units during any lifting epoch to establish an inherent lateral stability in the craft. These units also provide a governing action to control the power input of the motor, being that the sustaining medium is constantly varying, because of the usual atmospheric distribution conditions, necessitating a constant change in the speed of the motor to maintain a constant lifting force, especially when encountering air-pockets whereupon the load is suddenly removed from the motor because of a lack of stability in the sustaining medium, the motor will automatically accelerate in speed and provide the necessary amount of lifting force to maintain the desired altitude and in this regard, being that this aircraft provides its own relative wind speed as a component of lift it will maintain a relatively low-cost high-speed operation at higher altitudes than are possible of negotiation with the conventional type of aircraft, also because the craft, operated "tail high", will convert the drag due to incidence into a forward thrust component.

Further in regard to the aforementioned "forward thrust component", it can be readily seen that the axes of the twin arranged lifting units are disposed in pivotal relation coaxially with shaft 35, Fig. 5 of drawings, therefore, the axes of the twin units may be positioned in angular relation to a plane passing horizontally through the fore and aft axis of the fuselage without adding any feature to the construction, nor destroying the transverse dihedral lifting action of the twin units the means for the provision of which is one of the important novel features of this invention. The axes of the lifting units may be positioned at a forward tilted angle in aircraft constructed for the highest economical operation, and at a rearward tilted angle in aircraft constructed for high speed service wherein the cost of operation is a secondary consideration.

In explanation of the foregoing paragraph it is well to set forth that during sustained flight of an aircraft having this type of revolvable wings, the factors for producing lift, such as, the angle of air incidence of the wings, the wing cross section, the wing curves, and relative chord, are always in relation to the circular, or spiral, path of travel of any given point in the wing; this path is constantly changing in accordance with the variation in the forward speed of the aircraft and the rotative speed of the lifting unit, and there is a certain relation between these two last mentioned speeds at which the most economical operation is reached. Where higher speeds of aircraft service is required, the positioning of the axes of the lifting units at a rearward angle compensates in a measure for the loss of lift due to operating speeds at which said spiral path approaches a near parallel relation to the fore and aft axis of the wing, thereby keeping the rotative speed of the lifting unit and consequent resistance to turn, down to a minimum.

Regarding the provisions for safety, more specifically, one of the objects of this invention is to eliminate as much as practicable the human element in stabilization which is accomplished in this invention by the fixed transverse dihedral lifting effect, simple, dependable adjustment, along pre-established non-changeable lines only, to effect longitudinal equilibrium and simple means for quickly and positively causing autorotation of the lifting units in event of power failure in mid-air. Auto-rotation of the units is accomplished by the manipulation of a single actuating device, the handwheels 65, by means of which the eccentrics of all lifting units may be quickly reversed after which the action upon the relative, wind due to the more or less perpendicular descent of the craft, will recurrently and constantly develop kinetic energy as each wing-like vane enters, again and again, the lifting epoch of the orbital paths of their travel. This kinetic energy and consequent lifting effect may be greatly increased at the time of alighting or whenever desirable by quickly returning the vanes to their original lifting angle. Other objects are to provide stream-line means for supporting the stress in the wing-like vanes, at intermediate points along their longitudinal axes, against the strains due to centrifugal force and the tension and compression strains due to lift, means for controlling the horizontal position of the craft during hovering flight and means for slowing down the speed of the craft. Regarding economy: because of compactness, this craft has lower internal strain components, requires less stress elements, and is much lighter in weight, and because the lifting vanes are very thin the structural resistance is low per unit of lift.

Inherent longitudinal stabilization may be provided by the application of the automatic stabilizing device described in the drawings and specifications of former application Serial Number 443,139, filed April 10, 1930, now Patent 1,972,336 dated Sept. 4, 1934, and the craft thus provided with inherent stability will maintain an even keel and constant altitude under the usual atmospheric distribution conditions without the attention of the pilot.

In short, the main object of this invention is to provide a construction of the above nature which, with the addition of a device to provide automatic longitudinal stability, will eliminate, almost entirely, the human factor of stabilization and withal, an aircraft which will be economical in operation and fly at a high rate of speed at higher altitudes than the present conventional types. Other objects will be in part obvious and part pointed out hereinafter.

The invention accordingly consists in the features of construction, combination of elements, and arrangement of parts as will be exemplified in the structure to be hereinafter described and the scope of the application of which will be indicated in the following claims.

In the accompanying drawings, in which are shown one or more of various possible embodiments of the several features of this invention, Figure 1 is a plan of the entire apparatus;

Fig. 3 is a side elevation of the same;

Fig. 4 is a front elevation of a pair of lifting devices and associated parts;

Fig. 5 is a plan of two lifting devices partially in section in order to show the parts more clearly;

Fig. 6 is a sectional elevation of a lifting device showing driving and adjusting mechanism;

Fig. 7 is a diagrammatic front elevation of apparatus comprising another embodiment of certain features of the invention;

Fig. 8 is a sectional elevation taken substantially along the line 8—8 of Fig. 5; and Fig. 9 is a sectional plan taken along the line 9—9 of Fig. 8.

Similar reference characters refer to similar parts throughout the several views of the drawings.

Figure 1:
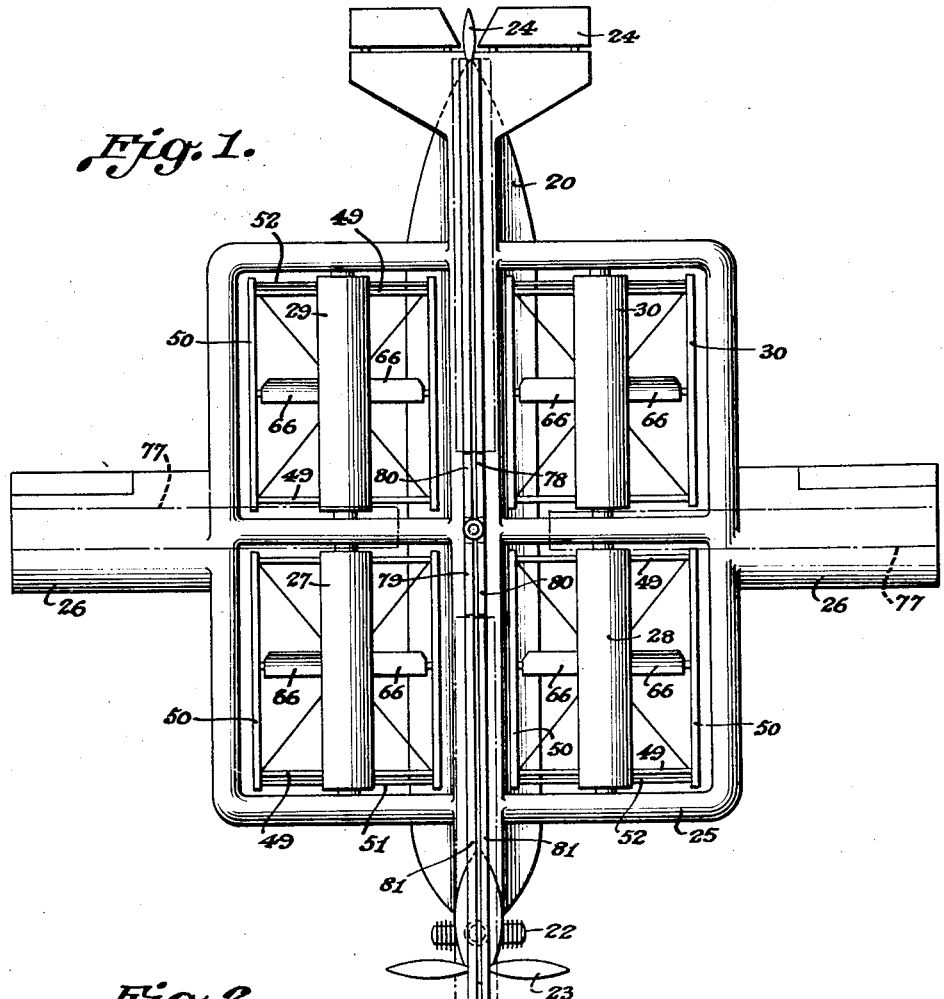
Figure 2:
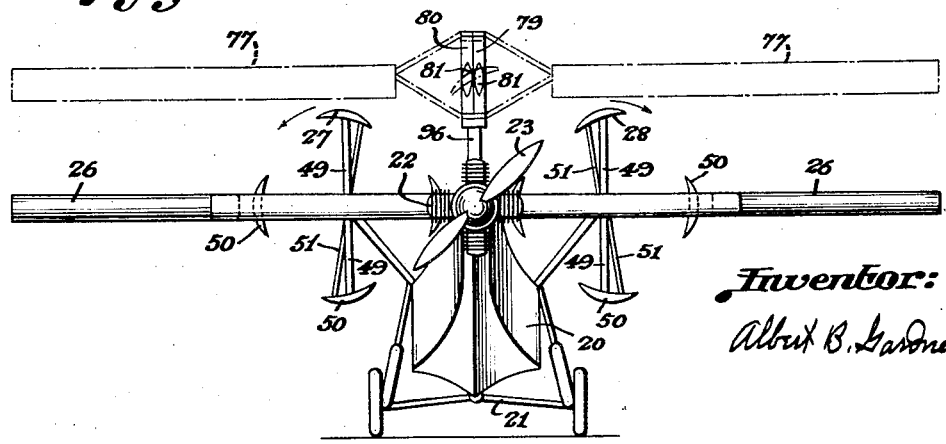
Fig. 2 is a front elevation of the apparatus shown in Fig. 1.

Referring now to Fig. 2 of the drawings in detail, there is shown at 20 a body or fuselage which is mounted upon running gear 21 of any desired type. At the forward end of the fuselage is a motor 22 driving a propeller 23 of the usual form.

At the rear end of the fuselage is the usual apparatus 24 for vertical and horizontal steering of the craft. This is controlled in the usual way.

Mounted upon the fuselage is a frame 25 provided with laterally extended wings 26 at each side adapted to exercise the usual lifting function to some substantial extent when traveling through the air. These wings are not essential to the success of this invention but are shown as a possible embodiment to provide means for sustaining flight in event of power failure in mid-air.

Recurring to frame 25, it will be seen, as shown in plan, that this frame is provided with four lifting devices 27, 28, 29 and 30. Each of these devices is substantially identical in construction, and it is to be noted that many of the advantages of this invention will be gained with a single pair of these lifters, although for best action a greater number of them is now considered preferable.

Taking up now the construction of these lifting units, and having reference first to Fig. 6 of the drawings, there is shown at 31 an engine of any desired type driving the shaft 32 which, through bevel gears 33 and 34, drives the cross shaft 35. As best shown in Fig. 5 of the drawings, the shaft 35 drives directly a bevel pinion 36 and, through the spur gears 37, drives likewise a bevel gear 38. These pinions 36 and 38 respectively drive the bevel gears 39 and 40 which form the primary driving elements of the lifting units 28 and 30 respectively. It is understood that the shaft 35 extending in the opposite direction crosswise of the machine drives by similar means lifting units 27 and 29. The action of the bevel gear 39 and parts driven thereby, being substantially identical with that of the corresponding parts in the other lifting units, will alone be described in detail. This gear, acting through the sleeve-like extension 41 and link connection 42, drives a rotary frame 43 journaled by suitable ball bearings at 44 and 45 upon a central non-rotary tube 46. This frame comprises fittings or spiders 47 connected by the longitudinal tubes 48 and each provided with four radial arms or spokes 49.

Recurring to Fig. 6 of the drawings, each of the arms 49 has pivotally secured at its outer end a lifting vane 50 which is likewise pivoted to the opposite arm 49 of the lifting device in such a manner that the vane may rock about a line substantially central thereof and parallel to the central tube 46. These vanes, as shown in the drawings, are of stream-line form and are pivotally connected at points adjacent their rear edges by means of the links 51 and 52 with a central fitting 53 journaled upon an eccentric 54. The link 52 is rigidly connected at its inner end with the eccentric ring 53, whereas the remaining links 51 are pivotally connected thereto. The eccentric 54 is pivoted at 55 to the frame of the machine, as shown in Fig. 5 of the drawings, and is provided with an arcuate slot 56 through which the tube 46 passes. Formed on this eccentric is a gear segment 57 meshing with and controlled by a mutilated pinion 58. As the latter part is rotated, it is seen that the eccentric is swung about the pivotal connection 55 and its eccentricity varied, as desired, along a fixed line of action passing through the axes of eccentric 54 and the central tube 46. It is also seen that the pivotal connection 55 is positioned on a line at one side of a horizontal line passing transversely through the axes of the central tubes 46 of any twin-arranged lifting units, and that the amount of this offset in the position of said pivotal connection 55 may be such as to provide an inclination of the mean direction of thrust, during the lifting epoch of vanes 50, toward the upper end of a line passing vertically through the longitudinal axis of the fuselage thus providing a transverse dihedral effect to provide an inherent transverse stabilization of the craft.

The swinging of the pinions 58, which may be journaled upon the central tube 46, is brought about as shown in Fig. 4 of the drawings by cranks 59 connected by links 60 with worm wheel segments 61 meshing with worms 62 formed in the case of each pair of lifting devices respectively upon a rotary tube 63 and an inner shaft 64 controlled by hand-wheels 65. It will thus be seen that the pitch or inclination of the lifting vanes may be adjusted as desired, and the lifting effect with a given speed of rotation may be correspondingly varied. It will also be seen that the lifting vanes are substantially streamline in their action, lifting by the lateral element of their travel and substantially feathering in their up-and-down movement. It is also seen that were the arcuate slot 56 extended an equal distance each side of the axis of the eccentric 54 a downward as well as an upward thrust may be provided, therefore by one movement of hand-wheels 65 all eccentrics could be simultaneously and quickly reversed to cause auto-rotation of the lifting units in event of power failure in mid-air.

It is also to be noted that by a suitable adjustment of the above parts the rate and time of change of incidence to the air may be altered. For example, denoting the positions of these planes in their travel by analogy to the hands of a clock, 12 and 6 o'clock being on a line passing through the axes of the central tube 46 and its eccentric 54, they may be so arranged that at the nine-o'clock and three-o'clock positions they move substantially edgewise, and from the half past ten- to half past one-, as well as from the half past four- to half past seven-positions, they maintain a substantially constant incidence at the most effective angle. Their change from this angle of incidence to and from their angles of what might be termed zero incidence occurs from the half past seven- to the half past ten-positions and from the half past one- to the half past four-positions. The angle of incidence, of course, has reference to the circle denoting the path of travel of the vanes.

At the center of each lifting device, or at frequent intervals in lifting units of great length, there is preferably provided a feathering strut the stream-line fairing of which provides modified propeller vanes 66 each having a universal pivotal connection as shown at 67 in Fig. 8 of the drawings at their outer ends with one of the lifting vanes 50. Aligned with the pivotal connection 67 is a pivotal connection 68 at the inner ends of the vanes 66. The journals at each end of vanes 66 to be equipped with means (for example a ball-bearing of the so-called deep-groove type) to support end thrust caused by centrifugal force or the load due to lift. The axis of the pivots is near the forward edge of the vane so that it tends to move toward a plane transverse to the axis about which the corresponding lifting device rotates, this tendency being resisted in each case by a spring 69 connected by a crank 70 with the propeller vane. In this manner, as the speed of rotation of the propeller vane increases, its pitch automatically becomes less. The springs 69 are all connected with a ring 71 seated in a flanged collar 72 which is non-rotatable but is slidably mounted upon the inner tube 46. This collar 72, and with it the tension of the springs 69, is adjustable by means of a wire 73 passing over a pulley 74 and having its ends controlled as shown in Fig. 4 of the drawings by a hand lever 75 pivoted at 76. In this manner the action of the propeller vanes 66 is manually controlled so that their automatic variation of pitch may be governed as desired.

It is to be noted that by allowing free movement of cable 73, or positioning the collar 72 at a central point in relation to the spiral path traversed by vane 66 at any given speed of the craft, the struts will offer the least possible resistance to turn and produce the least possible disturbance of the air especially were the vanes of a spiral form as in an ideal propeller proportioned for the cruising speed at which the craft is to operate. It is also to be noted that by moving the hand lever farther, the corresponding collar 72 is moved to such an extent that the pitch of the blades or vanes is reversed, and thus any of these propellers may be at any desired time reversed and reversed to any desired degree of pitch. This action, of course, brings about a corresponding reversal of thrust of the propeller and a corresponding gain in flexibility of control of the entire craft.

It will thus be seen that there is provided apparatus which is of a simple and dependable character and which is nevertheless susceptible of complete adjustment in all particulars to meet the varying conditions of use. The primary lifting elements are of essentially efficient character and may be utilized for substantially vertical ascent or descent. In the forward travel of the machine, however, the ordinary vanes aid in a lifting effect and the propeller at the nose of the machine, as well as those of the lifting devices, contributes to a high speed of travel through the air. The automatic adjustment of the vanes governed as herein described tends to regulate the effect of the propellers by giving an increased thrust in proportion to the speed as the speed diminishes. The inherent stability of the craft, provided in this invention by the fixed transverse dihedral effect established by the proper positioning of the pivotal supports of the eccentrics controlling the angle of incidence of the rotary wings, is of exceptional advantage for safety because no degree of skill or alertness of the pilot can serve as a substitute for inherent stability in the craft itself. In short, the apparatus herein described attains the various objects of the invention and is well adapted to meet the conditions of the hardest practical use.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In an aircraft having a supporting rotor including an axle normally extending substantially parallel to the line of flight and a plurality of blades mounted parallel to and spaced from said axle and rigid struts connecting each blade adjacent each end thereof to said axle, whereby upon the revolving of said blades about the axis of the rotor and their translation along the line of flight their effective aspect ratio and effective lift vary, and a rigid strut supporting each of said blades intermediate said end struts to thereby effectively support the stresses due to said variation in the effective aspect ratio and effective lift of said blades.

2. In an aircraft having a supporting rotor including an elongated frame disposed for rotation on an axis substantially parallel to the line of flight including a plurality of lifting blades extending along said frame and connected adjacent each end of each blade to the respective end of said frame, said blades disposed longitudinally fore and aft whereby upon the revolving of said blades about said axis and their translation along the line of flight their effective aspect ratio and effective lift vary, and rigid means supporting each of said blades intermediate said end connections to thereby effectively support the stresses due to said variation in the aspect ratio and lift.

3. An aircraft having twin arranged pairs of rotatable lifting units disposed for rotation on axes disposed longitudinally fore and aft, each including a plurality of pivotally supported revolvable wings, and eccentric devices for each unit for controlling the amount of air incidence of the wings, including pivotal supports for the eccentric devices, the pivots of said supports fixedly disposed in spaced relation to and on the same side of a horizontal line passing transversely through the axes of the pair of lifting units, whereby the reaction line of a pair of lifting units lie at an angle to each other.

4. In an aircraft as claimed in claim 3, and adjusting means for said supports.

5. In an aircraft as claimed in claim 3, and rack and pinion adjusting means for said supports.

6. In an aircraft as claimed in claim 3, and adjusting means for said supports including self locking means.

7. In an aircraft as claimed in claim 3, including reciprocatively operatable means for coincidently increasing the lifting action of the pair of lifting units at one end of the aircraft over that of the pair at the other end, to thereby effect longitudinal equilibrium during flight.

8. In an aircraft as claimed in claim 3, including reciprocatively operatable means for coincidently increasing the lifting action of all of the lifting units on one side of the aircraft over that of all of those on the other side, to thereby effect lateral equilibrium during flight.

9. In an aircraft as claimed in claim 3, including reciprocatively operatable means for adjusting all of the eccentric supports coincidently, to thereby control the amount of the combined lifting effect of all of the lifting units in constant altitude flight.

10. In an aircraft as claimed in claim 3, including reciprocatively operatable means for adjusting all of the eccentric supports coincidently, to thereby control the amount of the combined lifting effect of all of the lifting units in constant altitude flight, and self locking means for holding said eccentric supports in any adjusted position.

11. In an aircraft as claimed in claim 3, including reciprocatively operatable means for quickly and positively adjusting the air incidence of all of the pivotally supported revolvable wings, during their lifting epoch, coincidently from a lifting angle to a gliding angle, to thereby cause auto-rotation of said lifting units to sustain the aircraft in slow vertical descent.

12. In an aircraft as claimed in claim 3, and streamline feathering struts for supporting the stress of said wings at intermediate points in their length against the strains due to lift and centrifugal force.

13. In an aircraft as claimed in claim 3, and streamline feathering struts for supporting the stress of said wings at intermediate points in their length against the strains due to lift and centrifugal force, the streamline fairing of which struts provide propeller vanes.

14. In an aircraft as claimed in claim 3, and streamline feathering struts for supporting the stress of said wings at intermediate points in their length against the strains due to lift and centrifugal force, the streamline fairing of which struts provide propeller vanes, and means controllable by pressure for varying the pitch of said vanes, to thereby control the directional position of the aircraft during hovering flight, or vertical ascent, and descent.

15. In an aircraft as claimed in claim 3, in which the streamline fairing of said struts provide modified propeller vanes, and means controllable by pressure for varying the direction of thrust of said vanes from a forward, or neutral, to a rearward, to thereby cause a brake action on the air for slowing down the forward speed of the aircraft.

16. An aircraft having a plurality of pivotally supported revolvable wings forming rotatable lifting units disposed in twin formation for rotation on axes disposed longitudinally fore and aft, each unit including an eccentric device for controlling the amount of air incidence of the wings, including a pivotal support for each of the eccentric devices, the pivots of said supports fixedly disposed in spaced relation to and on the same side of a horizontal line passing transversely through the axes of the pair of lifting units, whereby the reaction lines of the pair of lifting units lie at an angle to each other.

17. In an aircraft as claimed in claim 16, the further feature residing in an adjustable support for the eccentric device rotatably disposed coaxially with the lifting unit.

18. In an aircraft as claimed in claim 16, the further feature residing in a worm and segment adjusting means for said supports.

19. An aircraft having a plurality of pivotally supported revolvable wings forming rotatable lifting units disposed in twin formation for rotation on axes disposed longitudinally fore and aft, each unit including an eccentric device for controlling the amount of air incidence of the wings, and means for adjusting said eccentric devices upward and to one side, whereby the reaction lines of the pair of lifting units lie at an angle to each other.

20. An aircraft as claimed in claim 19, and means for adjusting the eccentric devices independently of each other, to thereby effect equilibrium of the aircraft.

21. An aircraft as claimed in claim 19, and means for adjusting all of the eccentric devices simultaneously to a reverse position, to thereby effect auto-rotation of the lifting units.

22. An aircraft as claimed in claim 19, and adjusting means including self locking means.

23. In an aircraft, a body, a rotatable lifting device, means for effecting rotation of said lifting device, including an axle mounted longitudinally fore and aft on said body, an elongated frame surrounding said axle and mounted for rotation thereon, a plurality of lifting blades mounted on and substantially parallel to said frame, struts supporting each blade from said frame adjacent the ends thereof, and a rigid strut connecting each blade to said frame intermediate said end struts.

24. An aircraft as claimed in claim 23, and streamline fairing for said struts.

25. An aircraft as claimed in claim 23, and pivotal supports for said struts.

26. An aircraft as claimed in claim 23, streamline fairing for said struts, and pivotal supports for said fairing disposed adjacent the leading edge thereof, to thereby cause the strut to feather into the relative wind due to flight and/or the rotation of the lifting device.

27. An aircraft as claimed in claim 23, streamline fairing for said struts, pivotal supports for said fairing, and means responsive to pressure for controlling the radial position of the streamline fairing of said struts.

28. In an aircraft, a body, a plurality of rotatable lifting devices disposed in twin formation for rotation on axes disposed longitudinally fore and aft, means for effecting rotation of said lifting devices, including axles mounted on said body, each lifting device including an elongated frame surrounding one of said axles and mounted for rotation thereon, a plurality of lifting blades mounted on and substantially parallel to said frame, struts supporting each blade from said frame, means for controlling the lifting effect of said blades, and means for adjusting the last mentioned means upward and to one side, whereby the reaction lines of the twin pair of lifting devices lie at an angle to each other.

29. In an aircraft having a supporting rotor including a frame disposed for rotation on an axis normally parallel to the line of flight including a plurality of lifting airfoils extending along said frame and connected adjacent each end of each airfoil to the respective end of said frame whereby upon the revolving of said airfoils about said axis and their translation along the line of flight their effective aspect ratio and effective lift vary, rigid means supporting each of said airfoils intermediate said end connections to thereby effectively support the stresses due to said variation in the aspect ratio and lift, and said frame constructed cylindrical in form to thereby facilitate the supporting of said airfoils intermediate said end connections.

30. In an aircraft as claimed in claim 29, and means for preventing the free flow of air through said frame whereby a substantial amount of air is impounded within said frame and whereby upon the translation of said frame along the line of flight and its rotation on its axis the air displaced and thrown off by said respective actions of said frame with its impounded air momentarily increases the density of the air, and relative wind speed, immediately surrounding said airfoils to thereby increase their lifting effect.

31. In an aircraft as claimed in claim 29, and said frame constructed cylindrical in form with a large portion of its outer walls substantially closed whereby the condition of the air immediately surrounding said airfoils is effectively controlled to thereby increase the lifting effect of said airfoils.

32. In an aircraft as claimed in claim 29, and a lifting airfoil connected to and extending from each side of said aircraft to sustain the aircraft in slow descent in event of the failure of the rotor in a like functioning.

33. In the combination as claimed in claim 29, a fuselage to which said rotor is pivotally connected and disposed for adjustment about a horizontal transverse axis, a tractor propeller disposed on the fuselage forward said rotor whereby upon adjusting said rotor to a position wherein its fore and aft axis lies at an angle to the line of airflow from said propeller and its translation along the line of flight the lifting air-foils become bathed in said air-flow or the relative wind due to flight or both, to thereby effect auto-rotation of said rotor.

ALBERT B. GARDNER.